United States Patent [19]

Cooper

[11] Patent Number: 5,061,220
[45] Date of Patent: Oct. 29, 1991

[54] VARIABLY TENSIONABLE DIAPHRAGM GAME CALL

[76] Inventor: Gary L. Cooper, HC-04, Box 62, Pocahontas, Ark. 72455

[21] Appl. No.: 578,936

[22] Filed: Sep. 7, 1990

Related U.S. Application Data

[63] Continuation-in-part of Ser. No. 437,586, Nov. 17, 1989, Pat. No. 4,960,400.

[51] Int. Cl.⁵ ............................................. A63H 5/00
[52] U.S. Cl. ................................... 446/208; 446/397
[58] Field of Search ............. 446/207, 208, 206, 205, 446/204, 203, 202, 180, 176, 213, 216, 397, 404

[56] References Cited

U.S. PATENT DOCUMENTS

| | | | |
|---|---|---|---|
| 1,367,176 | 1/1921 | Bridges | 446/202 |
| 3,020,675 | 2/1962 | Boecker | 446/208 |
| 3,579,903 | 5/1971 | Stewart | 446/208 |
| 3,738,056 | 6/1973 | Schultz | 446/202 |
| 4,218,845 | 8/1980 | Evans et al. | 446/202 |
| 4,221,075 | 9/1980 | Gallagher | 446/202 |
| 4,341,037 | 7/1982 | Moss | 446/204 |
| 4,637,154 | 1/1987 | Laubach | 446/207 X |
| 4,761,149 | 8/1988 | Laubach | 446/205 X |
| 4,927,399 | 5/1990 | Mueller | 446/203 X |
| 4,960,400 | 10/1990 | Cooper | 446/207 |

*Primary Examiner*—David N. Muir
*Attorney, Agent, or Firm*—Polster, Polster and Lucchesi

[57] ABSTRACT

A diaphragm type game call has at least one diaphragm mounted in a frame in such a way that the diaphragm cooperate with a part or parts of the frame to permit the tension of the diaphragm to be varied selectively, as by fixing the initial effective length of the diaphragm at the outboard edge of a leg of a U-shaped frame whereby the inboard edge serves as a fret of sorts to shorten the effective length of the diaphragm when the diaphragm is pushed against it by the tongue of the user, or by providing a fret intermediate the length of the diaphragm, or by providing one or both legs of a frame with channels into which and from which a diaphragm can be readily mounted and demounted to permit the selective tensioning of the diaphragm so mounted.

26 Claims, 3 Drawing Sheets

VARIABLY TENSIONABLE DIAPHRAGM GAME CALL

RELATED APPLICATIONS

This a continuation-in-part of Ser. No. 07/437,586 filed Nov. 17, 1989, now U.S. Pat. No. 4,960,400.

BACKGROUND OF THE INVENTION

This invention relates to diaphragm type game calls. As far as applicant is aware the mouth or diaphragm calls known heretofore have had diaphragms so mounted that their inner ends, i.e., the ends closest the throat of the user, are fixed to a frame. In my call that is a subject of application Ser. No. 437,586, one or more diaphragms have been mounted on legs in such a way to be supported only at their ends, the inner edge thereof being free to vibrate.

The frequency of sound produced by the stretched elastic diaphragm in any diaphragm type call depends upon the length, weight and tension of the diaphragm. Heretofore, the frequency of sound has been changed by using multiple diaphragms or by altering the tension of the diaphragm by tongue pressure.

One of the objects of this invention is to provide a diaphragm type call in which the tension of the diaphragm or diaphragms may be altered by means associated with the frame of the call.

Another object is to provide a call in which one or more diaphragms may be secured directly to a single frame member, rather than being sandwiched between two frame members.

Other objects of this invention will be apparent to those skilled in the art in light of the following description and accompanying drawings.

SUMMARY OF THE INVENTION

In accordance with this invention, generally stated, a diaphragm type game call is provided which comprises a frame and at least one diaphragm mounted in the frame and means associated with the frame for selectively varying the tension of the diaphragm. In one form of the invention, a U-shaped frame has a cross-piece connecting spaced, generally parallel leg members, at least one of which has a surface of substantial width between inboard and outboard edges of the leg member, and at least one diaphragm mounted along the outboard edge of the leg, in such a way that the effective length of the diaphragm extends from the outboard edge in the absence of tongue pressure on the diaphragm. When the diaphragm is biased by the tongue of the user toward the broad surface of the leg, the surface and inboard edge act as a fret of sorts, to shorten the effective length of the diaphragm and raise the pitch of the sound.

In another embodiment, a flexible frame is employed, the cross-piece of which is bowed, so that pressure of the tongue of the user against the cross-piece bow will straighten the frame, further to stretch the diaphragm and increase its tension, thus raising the pitch of the sound.

In yet another embodiment, a trident frame is provided, in which an intermediate finger or fret is provided, extending from the cross-piece generally parallel to the legs, and intermediate the inboard edges of the legs. The fret can be symmetrically positioned or asymmetrically positioned with respect to the legs, in such a way to be clear of the diaphragm in the absence of tongue pressure, and in contact with the diaphragm when the tongue pushes the diaphragm toward and against the intermediate fret. When the fret or finger is asymmetrically arranged, a different sound is produced, depending upon which side of the fret the breath is directed over. Such an arrangement may be employed with the call in which the diaphragm is mounted along an outboard edge of one or both legs, or a more conventional type of mounting, at which the effective length of the diaphragm is the length between the inboard edges of the legs. It can even be employed with the box cross-piece embodiment described.

In each of these embodiments, it is preferred that if a single diaphragm is employed, it is supported only at its ends by the legs, and is free of the cross-piece. When a plurality of diaphragms is employed, one of the diaphragms may be fixed along its inner most edge to the cross-piece.

When a plurality of diaphragms is employed, they may be coplanar, and either spaced from one another or abutted in such a way as to exert a sensible pressure against successive edges, or overlapped through a part of their width. In the latter case, a different sound is produced, depending upon the orientation of the call, that is, if one turns it over in his mouth, it will produce a different sound.

The diaphragm can merely be taped or otherwise secured, as by adhesive, to a single thickness of leg, rather than being sandwiched, as is the conventional mode.

Whether a single leg is employed, or a sandwich type construction, the legs can be wedge shape or stepped. In the former construction, the diaphragm or diaphragms will slope in a direction fore and aft of the mouth. In the latter construction, successive diaphragms will be spaced heightwise by the height of the step, and will, in effect by offset from the tongue side of mouth side of the call. Both of these constructions will permit allowance for variations in the slope of the roof of the mouth of the user.

In yet another embodiment, the tension of the diaphragm or diaphragms is selectively varied by providing means, in the form of receiving channels and mounting means, for pretensioning the diaphragms as they are mounted, and permitting adjustment of the tension.

In these various embodiments, the diaphragm may be planar, as is generally the case, or may be pre-corrugated, as distinguished from being provided with a thickened rib.

DESCRIPTION OF THE PREFERRED EMBODIMENT

Figure 1:
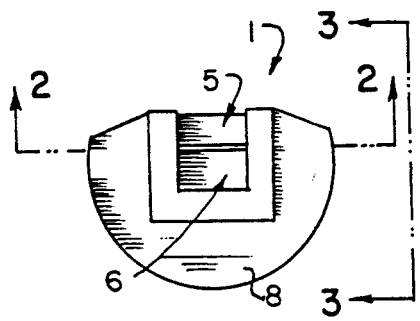
FIG. 1 is a top plan view of a game call described in my application Ser. No. 437,586, which also incorporates certain features of the invention of the present application.
Figure 2:
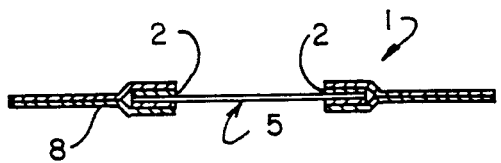
FIG. 2 is a sectional view taken along the line 2—2 of FIG. 1.
Figure 3:
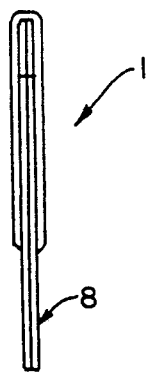
FIG. 3 is a view in side elevation taken along the line 3—3 of FIG. 1.

Referring now to FIGS. 1-3, reference numeral 1 indicates a diaphragm or reed type game call, sometimes called a mouth call as described in my copending application Ser. No. 437,586. The call 1 includes a frame 2 which, in this embodiment includes an upper frame member 3, a lower frame member 4, an outer reed or diaphragm 5 and an inner reed or diaphragm 6. The reeds 5 and 6 are sandwiched between upper frame member 3 and lower frame member 4. The assembled frame members and diaphragms are then surrounded on three sides by a yoke 8. Except for the arrangement of the diaphragms 5 and 6, spaced from one another in a single plane, the arrangement of frame members and yoke is conventional.

Figure 5:
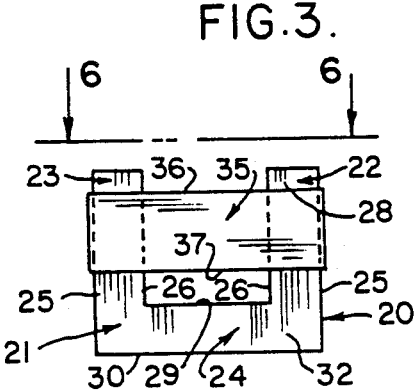
FIG. 5 is a bottom plan view of one embodiment of game call of this invention.
Figure 6:
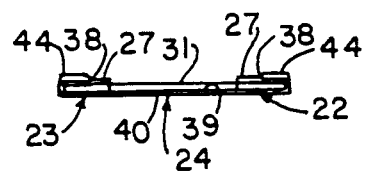
FIG. 6 is a view in end elevation taken in the direction of lines 6—6 of FIG. 5.

Referring to FIGS. 5 and 6, a call is shown with a frame 20 made up of a single member, with legs 22 and 23 joined by a cross-piece 24. The legs are planar along their lower surfaces, and have outboard edges 25 and inboard edges 26, between which upper surfaces 27 and lower surfaces 28 extend. The cross-piece 24 has a forward edge 29 and an after edge 30, between which upper surface 31 and lower surface 32 extend. When the call is in use, the forward edge 29 is closer to the lips of the user than the after edge 30; the upper surface 31 is adjacent the roof of the mouth of the user, and the lower edge is adjacent the tongue of the user.

In this embodiment, a reed or diaphragm 35, with a trailing edge 36 and a leading edge 37 and end edges 38, extends entirely across the surface 28 of the legs 22 and 23, around the outboard edges 25 of the legs and part way across the upper surfaces 27, where the outer ends of the diaphragm are secured by means of adhesive tape 44 which covers the ends of the tape and is adhered both to the tape and to the upper surface 27 of the legs. When the diaphragm is so mounted, it can be seen that an upper surface 39 of the diaphragm is unconnected to the surface 28 of the legs 22 and 23, so that its effective length of vibration is from outboard edge 25 of the leg 23 to the outboard edge 25 of the leg 22. When now the call is put into use, the user, by exerting pressure with his tongue against the surface 40 deflects the diaphragm against the surface 28 until the inboard edges 26 of the legs serve as frets of sorts, raising the pitch of the diaphragm by virtue of decreasing its effective length.

Figure 4:
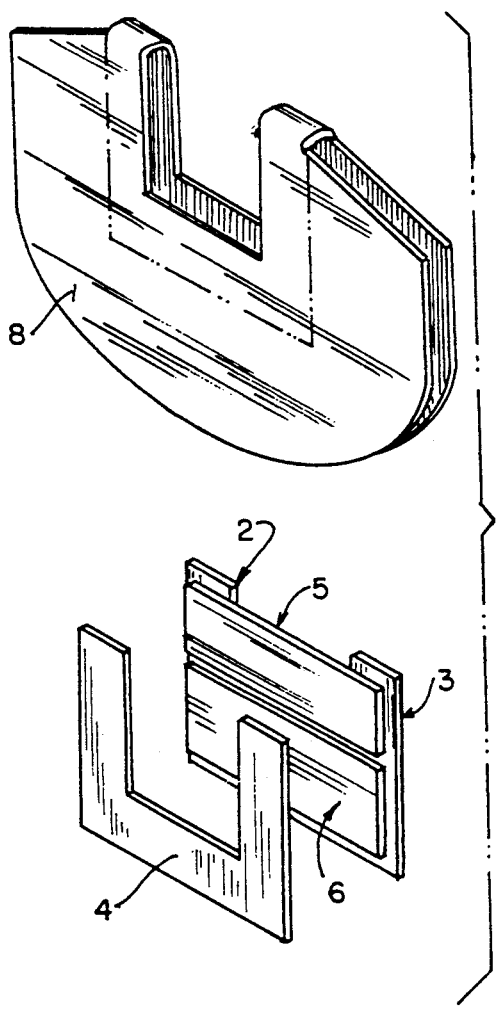
FIG. 4 is an exploded view of the call of FIG. 1 before it is fully assembled.

It can be seen that two frame members can be employed, provided that the second frame sandwiches the ends of the diaphragm that extend part way over the surface 27. However, the use of the tape 44 or adhesive or even velcro, a strip of which can be mounted on the surface 27 and on the contiguous surface of the reed or diaphragm, permits the setting of the tension of the diaphragm, and provides a simple construction. It will be seen that, like the second frame member, the yoke will be attached to the upper side of the frame, so as not to interfere with the effective length of the diaphragm. If a yoke of the type shown in FIG. 4 is employed, one side can be cut away to clear the diaphragm on its lower side.

Figure 7:
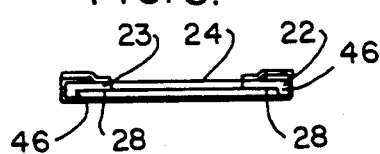
FIG. 7 is an end view corresponding to the view shown in FIG. 6, of another embodiment.

In FIG. 7, a call is shown that is substantially the same as that shown in FIGS. 5 and 6, except that a rib 50 is provided immediately adjacent the outboard edges 25 of the legs 22 and 23, projecting downwardly from the lower surface 28 of the legs, so as to space the diaphragm 35 from the surface 28 inboard of the ribs 46. The height of the ribs 46 as shown in FIG. 7 is somewhat exaggerate for clarity, but it is not so great as to preclude or inhibit the movement of the diaphragm by the tongue against the arris between the lower surface 28 and the inboard edges 26 of the legs 22 and 23.

Figure 8:
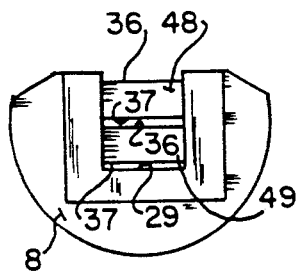
FIG. 8 is a top plan view of a call similar to the call shown in FIG. 5, but with a plurality of diaphragms spaced planarly from one another and from a cross-piece.

FIG. 8 is a top plan view of another embodiment, similar in construction to the embodiments shown in FIGS. 5 and 7, but with a plurality, in this case, two, diaphragms, an outer reed 38 and an inner reed 49, lying in a single plane, the reed 48 and 49 being spaced from one another, and the reed 49 being spaced from the forward edge 29 of the cross piece 24. In this embodiment, as well as those shown in FIGS. 9 and 10, both reeds are mounted only between the legs, and are free of contact with the forward edge 29 of the cross piece 24. In the embodiment shown in FIG. 8, the reeds 48 and 49 have forward edges 36 and trailing edges 37 that, as has been explained, are separated from one another by gap.

Figure 9:
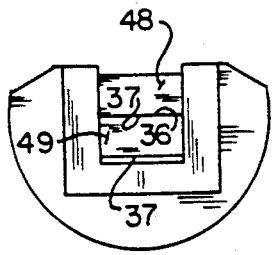
FIG. 9 is a top plan view of a call similar to that of FIGS. 5 and 8, but with two diaphragms in abutment.

In the embodiment shown in FIG. 9, the trailing edge 36 of the reed 49 abuts the leading edge 37 of the reed 49, the two edges being slightly compressed.

Figure 10:
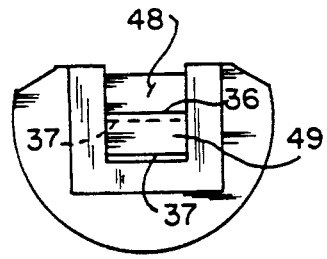
FIG. 10 is a top plan view of a call similar to the calls of FIG. 5, 8 and 9, with diaphragms overlapping along contiguous edges.

In FIG. 10, the trailing edge 36 of the reed 49 overlaps the leading edge 37 of the reed 48. In this embodiment, a conventional two piece frame can be used, in which the diaphragms are sandwiched between the frame members as shown in FIGS. 1-4, if desired, the novelty in such an arrangement arising from the fact that the diaphragms are mounted only at their ends, and the sound produced by inverting the call is sufficiently different to provide additional versatility as compared with conventional calls.

Figure 11:
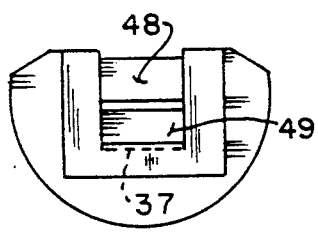
FIG. 11 is a top plan view of a call similar to that of FIGS. 5, 8, 9 and 10, but with the innermost diaphragm secured along its inner edge to a cross-piece.

FIG. 11 is a top plan view of a call constructed in accordance with FIGS. 5-7, in which two diaphragms are used, the inner reed 49 being mounted along its leading edge 37 to the cross piece 24.

Figure 12:
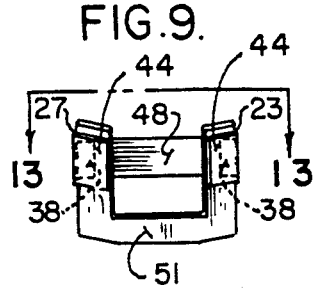
FIG. 12 is a view in perspective of a call in which the cross-piece is bowed.
Figure 13:
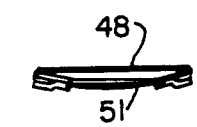
FIG. 13 is a view in end elevation in the direction along the line 13—13 of FIG. 6, of the call shown in FIG. 12.

In FIG. 12, a call made generally in accordance with the construction of FIGS. 5-7, except that a cross piece 51 is bowed in a direction away from the diaphragm 48. This causes the legs 22 and 23 to be canted, which not only provides a clear span for the diaphragm 48 between the outboard edges 26 of the legs, but, when the cross piece 51 is pushed toward straightened condition by the tongue, it increases the tension of the diaphragm 48, thus raising the pitch. In this embodiment, it will be observed that the diaphragm is attached to the upper side of the frame, rather than the lower side.

Figure 14:
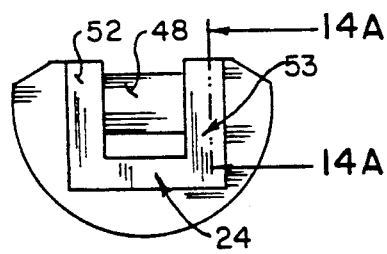
FIG. 14 is a top plan view of a call in which a single thickness leg is employed, which is wedge shaped.
Figure 14A:
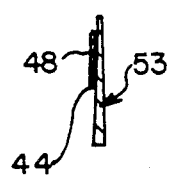
FIG. 14A is a sectional view taken along the line 14A—14A of FIG. 14.

In the embodiment shown in FIGS. 14 and 14A, a single frame member is employed, the legs 52 and 53 of which are wedge shaped, tapering convergently from the cross piece 24 to their free ends, as shown particularly in FIG. 14A. The call of this embodiment is particularly helpful to persons the roof of whose mouths slope downwardly forwardly.

Figures 15, 16:
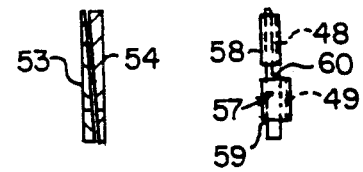
FIG. 15 is a sectional view corresponding to the section shown in FIG. 14A of a call in which the leg is wedge shaped and made up of two pieces, superimposed.
FIG. 16 is a view in side elevation of a call in which a leg is stepped in a direction away from the cross-piece.

The embodiment shown in FIG. 15 is substantially the same as that shown in FIGS. 14 and 14A, except that a double frame is employed, the leg convergently outwardly, and legs 54 of which taper divergently in the same direction, the diaphragm sloping from the usual plane, in any event.

In the embodiment shown in FIG. 16, legs 57 are stepped, with a thin forward section 58 and a relatively thick after section 59, defining between them a step 60. Diaphragms 48 and 49 are mounted on the sections 58 and 59, to space them heightwise.

Figure 17:
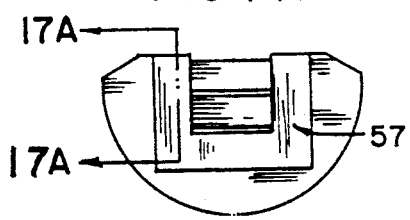
FIG. 17 is a top plan view of a call in which the legs are stepped as shown in FIG. 16, but made as a composite with diaphragms sandwiched between leg components.
Figure 17A:
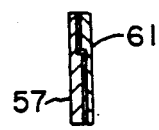
FIG. 17A is a sectional view taken along the line 17A—17A of FIG. 17.

In the embodiment shown in FIGS. 17 and 17A, two frame members are used, the second frame member having legs 61 formed complementarily to the leg 57, as shown particularly in FIG. 17A.

Figure 18:
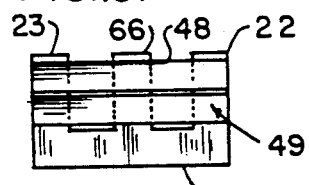
FIG. 18 is a bottom plan view of yet another embodiment of game call of this invention with a symmetrical trident frame.

In the embodiment shown in FIG. 18, a single frame member is shown with the usual legs 22 and 23 projecting from a cross-piece 64, from which, in this embodiment, a symmetrically positioned third leg or finger 66 extends, across which reeds 48 and 49 extend. It can be seen that when the reeds are displaced toward the inboard edges of the legs 22 and 23, the reed will also be brought into firm contact with the finger 66, the exact area of the finger 66 upon which the diaphragm bear being a function of the position and pressure of the tongue. This embodiment of call is particularly suitable for use with a frame of the sort shown in FIG. 7, in which a rib is provided along the outboard edges of the legs 22 and 23 to space the reeds 48 and 49 both from the inboard edges of the legs, and from the finger 66.

Figure 19:
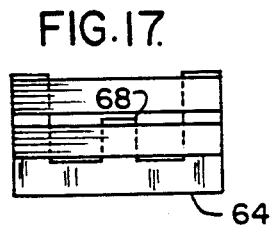
FIG. 19 is a bottom plan view of another embodiment of the call frame shown in FIG. 18.

In FIG. 19, a finger 68 is provided that extends short of the reed 48, so that only the reed 49 is affected by the finger.

Figure 20:
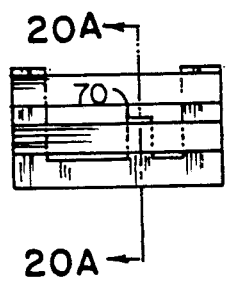
FIG. 20 is a bottom plan view of yet another embodiment of frame shown in FIGS. 18 and 19.
Figure 20A:
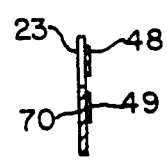
FIG. 20A is a sectional view taken along the line 20A—20A of FIG. 20.

In FIGS. 20 and 20A, another version of the trident frame is illustrated, in which a finger 70, of the length of the finger 68 of the embodiment shown in FIG. 19, is shown asymmetrically positioned with respect to the legs 22 and 23. In this embodiment, depending upon which side of the finger 70 the tongue engages the reed 49, the pitch of the reed 49 will increase a different amount. This increases the versatility of the call.

Figure 21:
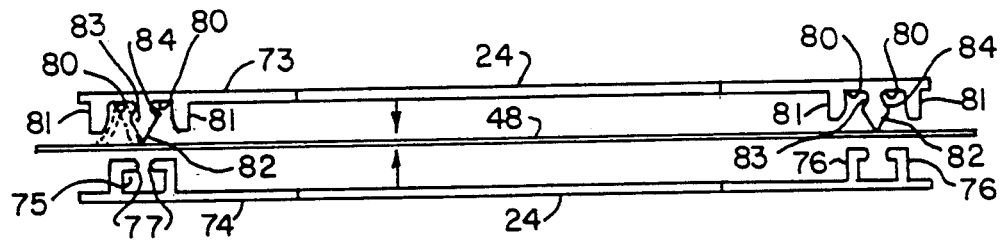
FIG. 21 is an enlarged exploded view in front elevation of yet another embodiment.
Figure 22:
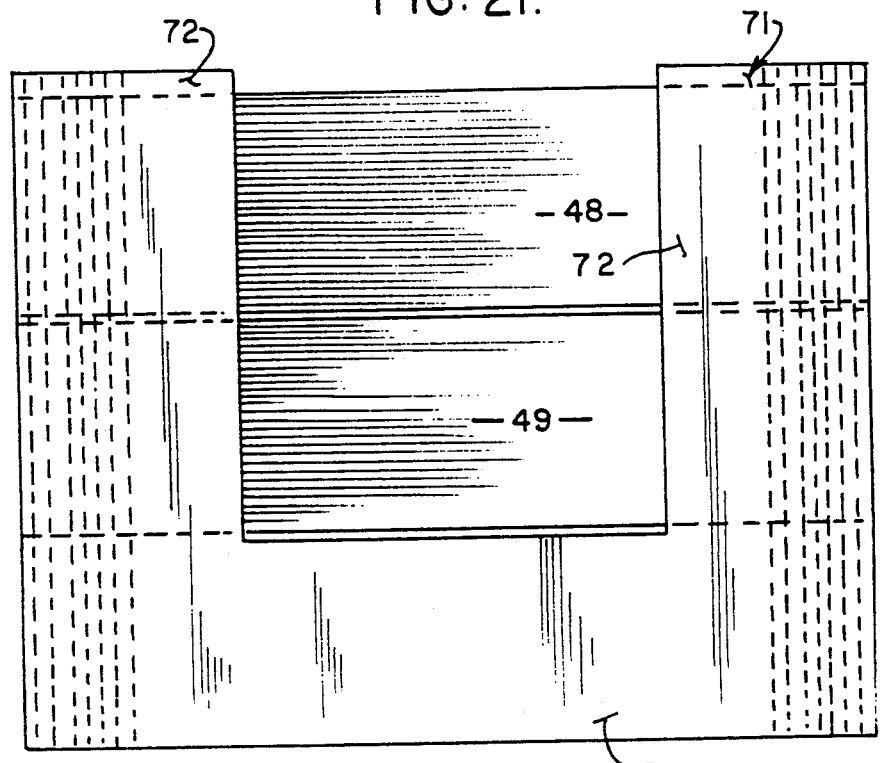
FIG. 22 is a detail is a view in top plan of the embodiment of call shown in FIG. 21, assembled.

Referring now to FIGS. 21 and 22, a frame 71 is made up of two frame members, an upper frame member 73 and a lower frame member 74. Legs 72 of the lower frame member 74 are provided with channels 75 extending in the long direction of the legs. The channels are defined by side walls 76 at the free ends of which lips 77 project toward one another. The upper frame member 73 is provided with channels 80, complementarily oriented and positioned with respect to the channel 75 of the lower frame 73. The channels 80 are defined by outer walls or ribs 81, and a central prong 82. The prong 82 is roughly diamond shaped, with a narrow leading edge from which surfaces diverge, and then converge to define shoulders 84 and a neck 83, which is made integral with the leg, as are the ribs 81. Reeds 48 and 49 are placed between the upper and lower frame members, as show in FIG. 21, are stretched to the desired degree of tautness, and mounted by moving the channel 77 and the prong 82 toward one another until the prong enters the channel, moving the lips 77 apart until they clear the shoulder 84, when they move in to clamp the reeds in place and hold the two halves of the frame together. This is similar to the "zip lock" seals that are in common use. Of course, one can mount the diaphragm or diaphragms on one side first, and then tension the diaphragms and clamp the unsecured end. In any event, the upper and lower frame can be separated again, either along both legs or along only one leg, to permit the tension of the diaphragms to be adjusted.

Figure 23:
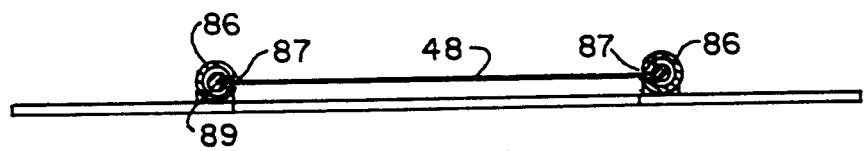
FIG. 23 is in front elevation view of still another embodiment.

In the embodiment shown in FIG. 23, tubes 86, with a slot 87 extending axially through the length of the tube, are secured to legs of a call. A diaphragm carrier 89 is arranged to mount an end of the diaphragm or diaphragms in such a way as to permit the diaphragm to be selectively tensioned. The carrier 89 can take the form of another slotted tube, or a solid rod around which the diaphragm can be wrapped, but in any event, the diaphragm or diaphragms are first mounted on the carrier 89, and then the carrier 89 is slid axially into the tube 86, with the diaphragm extending through the slots, as shown in FIG. 23. It can be seen that if the tubes 86 are positioned near or at the outboard edges of the legs to which they are secured, a construction akin to that of the embodiment shown in FIG. 7 will result, in which the diaphragm can be moved to engage the inboard edges of the legs.

Figure 24:
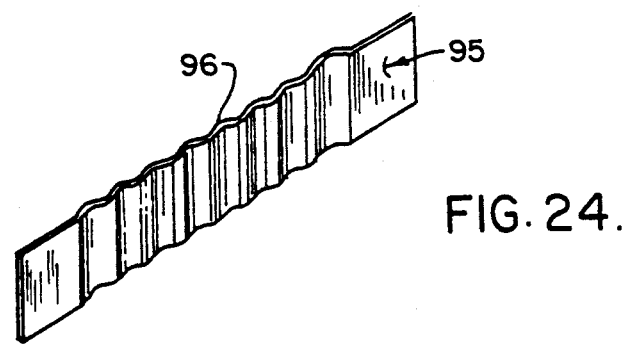
FIG. 24 is a view in perspective of a corrugated diaphragm.

In any of the embodiments, the diaphragm or reed can be corrugated, either transversely to the long dimension of the diaphragm as shown in FIG. 24, or parallel to that long dimension, or in some intermediate orientation, to give distinctive sound without materially affecting the ability of the diaphragm to vibrate, as distinguished from the provision of thickened ribs, which would serve as stiffening members. When the corrugations 96 of the diaphragm 95 shown in FIG. 24 are oriented as they are shown, the straightening of the diaphragm under tension gives rise to a continuous biasing, by the inherent resilience of the corrugated material, so as to provide a substantially uniform tensioning of the diaphragm in use.

Numerous variations in the construction of the game call, within the scope of the appended claims, will occur to those skilled in the art in the light of the foregoing disclosure. Merely by way of example, other "zip-lock" types of mounting arrangements can be used, various combinations of the different embodiments of call shown and described can be used, and additional numbers of diaphragms. The tubes of the embodiment shown in FIG. 23, which are shown as circular in transverse section, can be square or polygonal in cross sectional configuration. The steps of the embodiments shown in FIGS. 16 and 17 are shown as parallel to one another and to the outer surface of the legs. One or both of the steps of each leg can be sloped in the fore and aft direction also. One or more of the diaphragms can be attached to the finger of a trident frame, and although such an arrangement reduces the versatility of the device, it produces a distinctive and effective call. These are merely illustrative.

Having thus described the invention, what is claimed and desired to be secured by Letters Patent is:

1. A variably tensionable diaphragm game call comprising a frame and at least one diaphragm mounted in said frame, and means associated with said frame for selectively varying the tension of said diaphragm, said frame being U-shaped, with a cross-piece connecting spaced, generally parallel leg members between which said diaphragm extends, at least one of said leg member having a surface of substantial width between respective inboard and outboard edges of said leg member, said diaphragm being mounted at said outboard edge of said leg and unattached to said surface between said inboard and outboard edges, whereby in use, the diaphragm tends to vibrate from the said outboard edge across the space between the legs unless the diaphragm is moved by the tongue of the user against said surface, when said surface and inboard edge tend to serve as a fret effectively to shorten the diaphragm and increase the tension, thereby to vary the pitch of the sound produced by the diaphragm.

2. The game call of claim 1 wherein the said diaphragm is mounted along the outboard edges of both legs, and both inboard edges and intervening surfaces serve, separately or simultaneously, depending on the placement of the tongue of the user, as frets.

3. The game call of claim 1 wherein a plurality of diaphragms are mounted to extend between said legs.

4. The game call of claim 1 wherein said diaphragm is supported only by said leg members and is unconnected to said cross-piece.

5. The game call of claim 4 wherein said diaphragm is spaced from said cross-piece.

6. The game call of claim 1 wherein said leg members are wedge-shaped in the direction away from said cross-piece.

7. The game call of claim 1 wherein a plurality of diaphragms is mounted on said leg members.

8. The game call of claim 7 wherein one of said diaphragms has an edge fastened along a forward edge of said cross-piece and another, contiguous, diaphragm is unconnected to said cross-piece.

9. The game call of claim 7 wherein two of said diaphragms overlap through a part of their surfaces between said legs.

10. The game call of claim 7 wherein two of said diaphragms are co-planar, with long edges abutting one another to exert edge pressure upon one another.

11. The game call of claim 7 wherein two of said diaphragms overlap through a part of their surfaces between said legs, whereby said call may be blown from either side, to produce a different sound, depending upon which side faces the tongue of the user.

12. The game call of claim 7 wherein at least two of said diaphragms have edges that touch through their span between the legs.

13. The game call of claim 1 including channel means carried by said legs for selectively mounting and demounting said diaphragm, and holding means cooperating with said channel means for holding said diaphragm at preselected degrees of tension.

14. The game call of claim 13 wherein the mounting means comprise two elongated tubes one at each leg, said tubes having longitudinally extending slots, facing one another, and open outer ends, and said holding means comprise gripping means snugly slidable in said tubes, said gripping means receiving end parts of said diaphragm and thereafter being slid, through said open outer ends of the tubes, into said tube, with the diaphragm extending through said facing slots.

15. The game call of claim 1 including mounting means carried by said legs for selectively mounting and demounting said diaphragm, and holding means cooperating with said mounting means, wherein the mounting means comprise one half of a zip lock type plastic fastener and the holding means comprise the other half, the diaphragm being sandwiched between the mounting and holding means near its ends, whereby the diaphragm is readily mounted and demounted and mounted with various degrees of tension between said legs.

16. The game call of claim 1 wherein the diaphragm is corrugated.

17. The game call of claim 1 wherein the said leg has a rib along said outboard edge over which said diaphragm extends, said rib serving to space said diaphragm from said surface when said diaphragm is not biased toward said surface by said tongue.

18. The game call of claim 1 wherein said diaphragm is supported solely by said leg members and is unconnected to said cross-piece.

19. A variably tensionable diaphragm game call comprising a frame and at least one diaphragm mounted in said frame, and means associated with said frame for selectively varying the tension of said diaphragm, said frame being U-shaped, with a cross-piece connecting ends of two spaced, generally parallel leg members on which ends of said diaphragm are mounted and between which said diaphragm extends, forwardly of said cross-piece and generally parallel to a forward edge of said cross-piece, said cross-piece being flexible and bowed, whereby pressure of the tongue on said cross-piece causes the cross-piece to tend to flatten, increasing the effective spacing of said legs from one another and increasing the tension in said diaphragm.

20. The game call of claim 19 wherein said diaphragm is supported solely by said leg members and is unconnected to said cross-piece.

21. The game call of claim 19 including channel means carried by said legs for selectively mounting and demounting said diaphragm, and holding means cooperating with said channel means for holding said diaphragm at preselected degrees of tension.

22. The game call of claim 19 wherein said leg members are wedge-shaped in the direction away from said cross-piece.

23. The game call of claim 19 including mounting means carried by said legs for selectively mounting and demounting said diaphragm, and holding means cooperating with said mounting means, wherein the mounting means comprise one half of a zip lock type plastic fastener and the holding means comprise the other half, the diaphragm being sandwiched between the mounting and holding means near its ends, whereby the diaphragm is readily mounted and demounted and mounted with various degrees of tension between said legs.

24. A variably tensionable diaphragm game call comprising a frame and at least one diaphragm mounted in said frame, and means associated with said frame for selectively varying the tension of said diaphragm, said frame being U-shaped, with a cross-piece connecting spaced, generally parallel, outer leg members and an intermediate finger extending generally parallel to said outer leg members and positioned to engage the diaphragm intermediate the legs when the diaphragm is moved toward the finger by the tongue of the user.

25. The game call of claim 24 wherein said finger is asymmetrically located with respect to said outer legs.

26. A variably tensionable diaphragm game call comprising a frame and at least one diaphragm mounted in said frame, and means associated with said frame for selectively varying the tension of said diaphragm, said frame being U-shaped, with a cross-piece connecting spaced, generally parallel leg members, said diaphragm being mounted on said leg members to extend between them, said leg members having outboard and inboard edges and a generally flat surface between them on at least one side, said surface being stepped intermediate its length, and diaphragms extending between said legs and mounted on said stepped portions whereby adjacent ones of said diaphragms are offset from one another by the height of said step.

* * * * *